3,392,068
HIGH ENERGY FUEL COMPOSITION CONTAINING MICRODIMENSIONAL FIBERS
Edwin C. Knowles, Poughkeepsie, and Frederic C. McCoy, Beacon, N.Y., assignors to Texaco Inc., New York, N.Y., a corporation of Delaware
No Drawing. Filed Nov. 17, 1964, Ser. No. 411,731
13 Claims. (Cl. 149—21)

This invention relates to a high energy fuel consisting of a stable suspension containing finely divided powdered material in a liquid hydrocarbon vehicle. This invention is an improvement over a commonly assigned co-pending application, Ser. No. 162,549, filed on Dec. 27, 1961.

The high energy fuel suspension of this invention is primarily useful as a high energy propellant of the suspension type. An outstanding feature of this fuel suspension is that it has exhibited unusual stability and retains its property of being flowable over an extended period of time without liquid or phase separation. The high energy fuel of the invention represents a significant advance in the field of suspension propellants.

The fuel suspension of this invention comprises a substantial proportion of a finely divided organic or inorganic powder which is insoluble in the liquid vehicle, an effective amount of vehicle-insoluble microfibers, an effective amount of a vehicle-soluble, gel-forming compound of a trivalent metal and the balance, a liquid hydrocarbon. More particularly, the propellant of this invention comprises 5 to 75 weight percent of a finely divided organic or inorganic powder which is insoluble in the liquid hydrocarbon vehicle, 0.2 to 3 weight percent of vehicle-insoluble microfibers 0.5 to 0.3 weight percent of a vehicle-soluble, gel-forming compound of a trivalent metal and the balance a liquid hydrocarbon boiling above about 150° F.

The process of preparing a stable high energy fuel suspension of a hydrocarbon-insoluble, finely-divided powder comprises first forming a gel by mixing and heating the liquid hydrocarbon with an effective amount of the hydrocarbon-soluble trivalent metal compound and cooling if necessary until a gel is formed. Thereafter, the insoluble microfibers and the finely divided insoluble material are mixed into the gel preferably with a high speed mixer to form the desired suspension. Moderately elevated temperatures may be employed if necessary to facilitate the preparation of the suspension.

High energy fuel suspensions may contain a variety of finely divided powders which impart the high heat energy content to these fuel compositions. Powders which can be employed in these fuels include aluminum, magnesium, beryllium, boron, boron carbide, beryllium hydride, aluminum hydride and carbon. It is essential that these powders be finely divided. They must have particle size less than 20 mesh. It is preferable that the powders be of a particle size less than 100 mesh. Still more desirable are powders having a particle size between 200 and 325 mesh. The particle size of the effective powders may also be expressed as an average particle size between 0.1 and 840 microns. The powders in a suspension need not be of uniform size, in fact, better suspensions results when the particle sizes are graduated. It is sometimes advantageous to use a mixture of powders in the same fuel suspension.

The finely-divided powders may be employed in the fuel suspension in an amount from about 5 to 75 weight percent based on the weight of the total fuel suspension in preparing a stable, flowable fuel. Fuels having substantially over 75 percent of the finely-divided powder become non-flowing and cannot be employed as a flowable fuel suspension. The preferred fuel suspension contains from about 20 to 50 weight percent of the finely-divided powders.

A critical component in the formulation of stable suspensions in the microdiamensional fibers, more conveniently referred to as microfibers. These fibers, which may be organic or inorganic in nature as long as they are hydrocarbon-insoluble at temperatures below about 250° F., provide the necessary matrix for retaining the insoluble powdered material in the form of a stable suspension.

The effective microfibers are insoluble in the liquid hydrocarbon vehicle and unreactive with the other components of the final composition, that is, unreactive with the liquid hydrocarbon vehicle, the finely divided powder, or the trivalent metal compound. Effective inorganic fibers are asbestos fibers, graphite fibers, glass fibers of various types and quartz fibers. Chrysotile fibers are a particularly preferred type of asbestos fibers, while soda-lime-glass fibers, quartz, microfibers, boro-silicate fibers and lead-glass microfibers are examples of effective glass microfibers. Organic microfibers effective in forming the stable high energy fuel suspensions are cellulose fibers, and their derivatives, such as, nitro-cellulose fibers, acetylated cellulose fibers, carboxylated cellulose fibers, amineotheyl cellulose fibers, cellulose phosphate fibers, carboxymethyl cellulose fibers and rayon fibers. Other effective organic microfibers are perfluoroethylene fibers, fibers of polyhalogenated olefin polymers, polypropylene fibers, polyvinyl alcohol fibers and polyvinyl acetal fibers. Glass, cellulose, asbestos and polypropylene fibers have proven particularly effective in forming the stable suspensions of this invention.

There is a a substantial difference between the organic and inorganic microfibers with regard to the average fiber diameter required for the preparation of a stable suspension. This difference is due at least in part to the different densities and structural configurations of inorganic and organic microfibers.

When employing inorganic microfibers it is necessary to employ microfibers having an average fiber diameter between 0.01 and 2.0 microns and preferably between 0.01 and 0.5 micron in order to form the stable suspension. When the inorganic microfiber diameter is above 2.0 microns, the fibers do not provide an adequate matrix for the suspension and maintenance of the insoluble powder materials in the form of a stable suspension.

In contrast, organic microfibers having fiber diameters as large as 20 microns can be used in preparing stable suspensions, although preferably the suspensions are prepared with organic microfibers having an average fiber diameter between about 1 and 12 microns. The upper fiber diameter limit of 20 microns for organic microfibers is critical for the formation of stable suspensions in the same manner as is the upper fiber diameter limit of 2 microns for inorganic microfibers. Stable suspensions are not formed with inorganic microfibers having an average diameter above 2.0 microns or with organic microfibers having an average diameter above 20 microns.

The concentration of the microfibers is between 0.2 and 3 and usually between 0.4 and 2.5 weight percent of the total suspension. To a large extent, the concentration of fibers is proportional to the amount of insoluble material suspended in the vehicle. With gel propellants in which the concentration of high energy powder material is between 10 and 75 weight percent of the total vehicle, the microfiber concentration usually falls between about 1 and 3 weight percent.

As noted above, the liquid vehicle is a hydrocarbon or hydrocarbon fraction boiling above about 150° F. The most widely used vehicle is a liquid hydrocarbon fraction boiling in the range between about 350–800° F. Kerosene and gas oil fractions are used in the preparation of the suspensions of this invention.

Hydrocarbon vehicles particularly useful in the formation of gel propellants comprise kerosene and gas oil fractions and jet fuels, such as, JP-1, JP-2, JP-3, JP-4 and RP-1. Particularly useful are hydrocarbon fractions comprising predominantly paraffinic straight chain hydrocarbons which have been separated from hydrocarbon mixtures such as kerosene, by procedures such as solvent extraction, urea complexing and treatment with molecular sieves.

Predominantly straight chain hydrocarbon fractions of this type have particularly high heats of combustion and are excellent vehicles for suspending large quantities of high energy powdered material in gel propellants.

A trivalent metal compound as a thickening agent is also essential for the preparation of a stable high energy fuel suspension. The compounds which are effective are all oil-soluble at elevated temperatures (250–300° F.) and form gels on cooking. A preferred class of compounds which can be employed are the aluminum salts of fatty acids in which the fatty acid radical has between 6 and 24 carbon atoms. These compounds are represented by the formula $(R-COO)_3Al$, in which R is an alkyl radical having from 5–23 carbon atoms. The class of compounds includes aluminum octoate, aluminum laurate, aluminum stearate, aluminum palmitate, aluminum myristate, aluminum oleate and the like, aluminum salts of aliphatic hydroxy acids and petroleum oxidates can also be used.

Another effective class of gel-forming compounds are the trivalent metal salts of hydrocarbyl acid orthophosphates. This class is illustrated by the formula:

$$(RR'PO_4)_3M$$

in which R and R' are either hydrogen or hydrocarbyl radicals the sum of the carbon atoms in R and R' being at least 16. M can be either aluminum, ferric iron, nickel, lanthanum or cerium. Examples of these compounds are aluminum ethyl oleyl phosphate, aluminum ethyl lauryl phosphate, aluminum methyl stearyl phosphate, aluminum ethyl stearyl phosphate, aluminum methyl oleyl phosphate, aluminum ethyl palmityl phosphate, aluminum stearyl phosphate, ferric stearyl phosphate, nickel stearyl phosphate, lanthanum ethyl oleyl phosphate and cerium ethyl oleyl phosphate. Mixtures of any of these may be used.

The hydrocarbon soluble trivalent metal compound is generally employed in a concentration from about 0.2 to 3 weight percent of the entire suspension. A preferred concentration is from about 0.5 to 2 weight percent.

The following examples illustrate the practice of this invention:

Example I 2 grams of aluminum octoate were dissolved by heating and stirring in 198 grams of light paraffinic mineral oil having a viscosity of 40 Saybolt seconds at 100° F., followed by cooling to form a soft gel. 1.0 gram of glass fibers having an average diameter between 0.05 and 0.2 micron were added by stirring for 1 minute in a Waring Blendor. 30 grams of 325 mesh flake aluminum powder were then mixed by hand stirring into 70 g. of the oil-aluminum soap-fiber blend. On the basis of the total blend in weight percent, there was 69% oil, 0.7% aluminum octoate, 0.35% fiberglass and 29.95% aluminum powder.

The foregoing suspension was a flowable suspension. It showed no surface liquid or phase separation after 4 week's storage at room temperature.

A composition substantially identical to the above except that it contained no fiberglass was flowable but it developed phase separation after 4 weeks' storage at room temperature.

Example II 1.1 grams of aluminum octoate was dissolved in 110 grams of kerosene boiling in the range of 330 to 510° F. 1.1 grams of polypropylene (1.5 denier) and 48 grams of 325 mesh flake aluminum powder were blended in by mixing with a Waring Blendor at about 5000 r.p.m.

The foregoing suspension was in the form of a thick gel. This suspension exhibits substantially no separation after a storage period of 1 year at ambient temperature.

Example III 1.0 gram of aluminum octoate was dissolved by heating and stirring in 99 grams of kerosene boiling in the range of 330 to 510° F. 2 grams of polypropylene having an average diameter of 16 microns and 43 grams of 325 mesh flake aluminum powder were mixed in according to the method disclosed in Example II above. A stable suspension was obtained using the polypropylene.

1.0 gram of aluminum octoate was dissolved in 99 grams of highly paraffinic gasoline (Udex raffinate), having a boiling range of 200–350° F., by heating and stirring. 1.0 gram of cotton linters having an average diameter of 18 microns was substituted for the polypropylene above and a new suspension prepared using 43 grams of 325 mesh flake aluminum powder. A stable suspension was realized through the use of cotton linters.

Example IV 1 gram of aluminum ethyl oleyl phosphate was dissolved in 97.5 grams of kerosene having a boiling range from 330 to 510° F. 1.5 grams of 1.5 denier polypropylene fibers and 100 grams of flake graphite having an average diameter of 10 microns were mixed in by hand stirring. The resulting suspension was a soft gel which was stable and exhibited no separation after one week's storage.

A similar suspension but containing no polypropylene was a soft gel which exhibited settlement after one week.

Example V

A suspension similar to that of Example IV was prepared using 325 mesh boron powder in place of the graphite. The resulting suspension with the boron powder and polypropylene was a stable, soft, uniform gel.

Example VI 99 grams of kerosene and 1 gram aluminum stearyl phosphate were heated to 150° C. A clear solution resulted which became a soft gel on cooling to 25° C. 80 grams of this gel, 1.5 grams of 1.5 denier polypropylene fibers 0.138 inch long and 34.4 grams of 325 mesh flake aluminum powder were thoroughly mixed. The product was a stable, soft, uniform gel.

Example VII 98 grams of kerosene and 2 grams of ferric stearyl phosphate were heated to 150° C. The resulting solution set up to a stiff gel on cooling. Upon vigorous stirring, a soft, grainy gel resulted. To this gel were added 1.5 grams of 1.5 denier polypropylene fibers 0.138 inch long and 42 grams of 325 mesh flake aluminum powder. After thorough mixing, a soft, uniform dispersion resulted.

Obviously, many modifications and variations of the invention may be made without departing from the spirit and scope thereof, and therefore only such limitations should be imposed as are indicated in the appended claims.

We claim:

1. A high energy fuel suspension comprising 5 to 75 weight percent of a hydrocarbon-insoluble powder having a particle size less than 20 mesh, 0.2 to 3 weight percent of hydrocarbon-insoluble microfibers selected from the group consisting of inorganic microfibers having an average fiber diameter between 0.01 and 2 microns and organic microfibers having an average diameter between 1 and 20 microns, 0.2 to 3 weight percent of a hydrocarbon-soluble trivalent metal compound represented by a formula selected from the group consisting of:

(1)                     $(RCOO)_3Al$ in which R is an alkyl radical having from 5 to 23 carbon atoms, the total number of carbon atoms in said compound being at least 18, and (2) $(RR'PO_4)_3M$ in which R and R' are selected from the group consisting of hydrogen and a hydrocarbyl radical, the sum of carbon atoms in R and R' being at least 16 and M is selected from the group consisting of aluminum, ferric iron, nickel, lanthanum and cerium, and the balance a liquid hydrocarbon boiling above about 150° F.

2. A high energy fuel suspension comprising 5 to 75 weight percent of a hydrocarbon-insoluble powder having a particle size less than 20 mesh and selected from the group consisting of aluminum, magnesium, beryllium, boron, boron carbide, carbon, beryllium hydride and aluminum hydride; 0.2–3 weight percent of hydrocarbon-insoluble microfibers selected from the group consisting of inorganic microfibers having an average particle diameter between 0.1 and 2.0 microns and organic microfibers having an average fiber diameter between 1 and 20 microns, 0.2–3 weight percent of a hydrocarbon-soluble trivalent metal compound having a formula selected from the group consisting of:

(1) $(RCOO)_3Al$ in which R is an alkyl radical having from 5 to 23 carbon atoms, the total number of carbon atoms in said compound being at least 18, and (2) $(RR'PO_4)_3M$ in which R and R' are selected from the group consisting of hydrogen and a hydrocarbyl radical, the sum of carbon atoms in R and R' being at least 16 and M is selected from the group consisting of aluminum, ferric iron, nickel, lanthanum and cerium, and the balance a liquid hydrocarbon boiling in the range from about 150° to 800° F.

3. A high energy fuel suspension according to claim 1, in which said hydrocarbon-insoluble powder is aluminum.

4. A high energy fuel suspension according to claim 1, in which said hydrocarbon-insoluble powder is carbon.

5. A high energy fuel suspension according to claim 1, in which said hydrocarbon-insoluble powder is boron powder.

6. A high energy fuel suspension according to claim 1, in which said hydrocarbon-soluble trivalent metal compound is aluminum octoate.

7. A high energy fuel suspension according to claim 1, in which said hydrocarbon-soluble trivalent metal compound is aluminum ethyl oleyl phosphate.

8. A high energy fuel suspension according to claim 1, in which said microfibers are glass fibers having an average diameter of 0.05 and 0.2 micron.

9. A high energy fuel suspension according to claim 1, in which said microfibers are polypropylene fibers having an average diameter of 16 microns.

10. A high energy fuel suspension according to claim 1, in which said microfibers are cotton linters having an average diameter of 18 microns.

11. A high energy fuel suspension according to claim 1, in which said hydrocarbon-insoluble powder comprises 20 to 50 weight percent of said suspension.

12. A high energy fuel suspension according to claim 1, in which said trivalent metal compound is ferric stearyl phosphate.

13. A high energy fuel suspension according to claim 1, in which said trivalent metal compound is aluminum stearyl phosphate.

References Cited
UNITED STATES PATENTS

| | | | |
|---|---|---|---|
| 3,035,948 | 5/1962 | Fox | 149—19 |
| 3,084,033 | 4/1963 | Kelly et al. | 149—19 X |
| 3,153,903 | 10/1964 | Morrell | 60—216 |
| 3,197,348 | 7/1965 | Skolnik et al. | 149—36 X |
| 3,203,841 | 8/1965 | Doyle | 149—21 X |
| 3,215,572 | 11/1965 | Papell | 149—2 |

BENJAMIN R. PADGETT, Primary Examiner.